Patented Oct. 31, 1933

1,932,889

UNITED STATES PATENT OFFICE 1,932,889

RECORD

Frazier Groff, Charleston, W. Va., assignor to Carbide and Carbon Chemicals Corporation, a corporation of New York No Drawing. Application August 10, 1931
Serial No. 556,299

10 Claims. (Cl. 106—1.5)

The invention relates to an improved sound record formed from a novel moldable composition, and having heretofore unknown properties.

Sound records usually take the form of discs having a continuous spiral groove impressed upon one or both surfaces thereof which carries recorded sound capable of being reproduced by a stylus or needle travelling in the groove.

The principal objects of the present invention are to provide a sound record having new and advantageous properties, and to provide a novel composition for forming the new record.

The invention broadly comprises a sound record having unusual qualities of resistivity, toughness, strength, playing life and sound quality which may be produced with either one or two playing surfaces in both rigid and flexible type records. The invention includes, as its principal feature of novelty, the use and adaptation of compositions containing vinyl resins, that is, resins resulting from the polymerization of certain vinyl compounds, for forming sound records, all as more fully hereinafter described.

Vinyl compounds can be polymerized to form resinous products for which various uses have been proposed. Also, it has been proposed to alter the properties of vinyl resins by polymerizing a mixture of two or more vinyl compounds, and by including other substances with the resin. These proposals have resulted in generally useful and improved resins, but vinyl resins possessing the requisite strength, toughness and uniformity of properties to be commercially successful for many uses have been unknown.

By experimentation I have discovered that a preferred type of vinyl resins are those resulting from the conjoint polymerization (by which is meant polymerization of two or more compounds while in mutual contact) of a vinyl halide, such as vinyl chloride, and an oxygen-containing vinyl compound, by which is meant particularly the vinyl esters of aliphatic acids, of which esters vinyl acetate is typical. The proportion of these substances in the original monomeric mixture is a controlling factor upon the resin produced. I prefer to use more than about 70% by weight of the vinyl halide and 30% or less by weight of the vinyl ester of an aliphatic acid. I have discovered that not every vinyl resin prepared from the specified proportions of these substances is a satisfactory resin for forming the new records. The resin must further possess a high fusion point, low solubility, and it must be tough and uniform in regard to all of these properties. Since the solubility of a resin of this type is an accurate indication of the other properties of the resin, I designate the vinyl resin preferred for use in my invention as a resin resulting from the conjoint polymerization of a vinyl halide and a vinyl ester of an aliphatic acid in the proportions of 70% or more by weight of the halide and 30% or less by weight of the vinyl ester of an aliphatic acid and which is less than about 30% soluble in toluene at 20° to 30° C. Throughout this specification and the appended claims the proportions of the various compositions will be expressed in parts or percentage by weight.

The preferred type of vinyl resins may be produced by causing a mixture of the vinyl compounds in the proportions set forth to be polymerized in the presence of a suitable liquid medium, such as paraffin hydrocarbons, aliphatic alcohols, and aliphatic ketones, and in the presence of a suitable polymerizing catalyst, such as benzoyl peroxide, at temperatures below about 60° C. These vinyl resins and the process of forming them do not constitute an essential portion of this invention.

The preferred vinyl resin may have various stabilizing substances incorporated therewith to insure its complete stability to light and heat. In general, the substances with are suitable stabilizers are those which are basic in nature, and which will not promote acid formation or oxidation. Examples of stabilizers are alkaline earth soaps, resinates, oxides, carbonates, or hydrates; water-insoluble amines, particularly aromatic amines; and ammonia and ammonia substitution products in general. Specifically calcium stearate, lime, the reaction product of lime and manilla copal resin, ethyl toluidine, benziline, tribenzyl amine, and the ethanolamines are preferred.

It is also possible to modify the plasticity of the vinyl resin by the addition of various proportions of modifiers or plasticizers. Examples of suitable modifying agents are carnauba wax, phthalic acid esters, certain rubber fractions, chlorinated diphenyl derivatives, tricresyl derivatives, halogenated naphthalene derivatives, glycol esters and the like. The preferred vinyl resins are unique in their ability to be plasticized without decreasing their tensile strength, and because the plasticity of the plasticized resins is retained at low temperatures, i. e., at —10° to —20° C. It is frequently desirable to use mixtures of modfying agents in the compositions. For example, a mixture of carnauba wax and a chlorinated naphthalene derivative makes possible the accurate reproduction of high frequencies, and improves the physical characteristics of the sound records.

The vinyl resins herein described, which may be stabilized and modified as desired, are the basic ingredients of my new record-forming compositions. These compositions may be colored by the addition of pigments, lakes or dyes, and stable colors of any shade may be produced. I have discovered that the stability of light tints and colors is increased, particularly with respect to actinic light, if titanium oxide or calcium carbonate or both are included in the composition.

The density and characteristics of the moldable compositions are determined by the filling materials used therein. Filling materials either cellulosic or non-cellulosic in nature may be used. Examples of cellulosic fillers are cotton flock, cotton linters, wood flour, paper pulp, and cork. Examples of non-cellulosic fillers are silica, mica, asbestos, talc, barytes, and rottenstone.

The compositions herein described are substantially non-flammable, as shown by the fact that a composition comprising 50% wood flour will not support combustion.

One of the most advantageous properties of the present compositions is the ability of these compositions to be remolded. Vinyl resin compositions are almost permanently thermoplastic and their use is economical because defective pieces and scrap material can be reclaimed without loss.

The following examples are illustrative of compositions which are suitable for forming the new sound records:

Example I 100 parts of vinyl resin
60 parts of ground barytes
40 parts of rottenstone
1 part of carnauba wax
1 part of calcium stearate
1 part of lime The vinyl resin of this composition was formed by the conjoint polymerization of 80 parts of vinyl chloride and 20 parts of vinyl acetate in the presence of benzoyl peroxide. The resin was less than 25% soluble in toluene at 25° C. The materials may be milled or mixed in any suitable manner to form the composition.

This composition may be used to form records of the rigid type of 0.025 inches or more in thickness, or it may be formed into thin sheets and secured to a flexible backing to form flexible records. The flexible records may be either single or double faced as desired. The method of securing the preformed composition to the flexible sheet may be a hot pressing operation, or the composition may be secured to the sheet by means of a solution of a vinyl resin in acetone or other solvent. It is not necessary to apply the composition as a preformed sheet. It may be applied to a flexible backing as a powder and hot pressed to form the record blank. In general, temperatures of about 130° to 140° C., and pressures up to 2000 pounds per square inch are suitable for molding and forming vinyl resin compositions.

Example II 100 parts of vinyl resin
87 parts of cotton flock
8 parts of fibrous talc
1 part of carnauba wax
1 part of calcium stearate and lime The vinyl resin of this composition was prepared as described in Example I, and was about 12% soluble in cold toluene.

This composition can be used to form records in the various ways above described. The records produced therefrom are less dense than those made from the composition of Example I.

Example III 100 parts of vinyl resin
10 parts of the reaction product of diethylene glycol monophthalate and ortho toluidine
1 part of carnauba wax
1 part of calcium stearate
1 part of lime
(100 parts of filling material)

The vinyl resin of this composition was identical with that of Example I.

This composition may be used to form tough, flexible sound records without the use of a flexible backing, and without the incorporation of a filling material. The filled composition may be used to form records as described in the previous examples. A particularly important use of this composition is in the production of reproducing sound records for household recording.

In all cases the records produced from the new compositions are tougher, stronger, more flexible and resilient, and lighter in weight than sound records which are commercially available at the present time. Sound records produced from vinyl resin compositions are extremely resistant to atmospheric conditions and to moisture in general. They are characterized by slight wear on the reproducing needles, and are resistant to needle wear. This is demonstrated by the fact that a sound record formed from a vinyl resin composition was played with an ordinary steel needle 200 times before the needle was worn appreciably, and this amount of service did not materially affect the record. By way of comparison the same type of needle can be used to play records of the kind now commercially available but once before the needle is worn to such an extent as to require replacement.

The sound records of the present invention are also characterized by a very low surface noise level. By reason of this fact, and because of the mechanical strength of the composition, and the accuracy with which it can be molded, it is possible to record more sound per square inch of playing surface on my new records than is possible on previously known records. This advantage greatly enhances the value of the improved records.

Many modifications of the new records and compositions are possible and are included within the invention as defined by the appended claims.

I claim:—

1. A record having a reproducing surface formed from a composition containing a vinyl resin identical with that resulting from the conjoint polymerization of a vinyl halide and a vinyl ester of an aliphatic acid in the proportions of at least 70% of the vinyl halide and which is less than about 30% soluble in toluene at 20° to 30° C., said record being characterized by a low surface noise level, resistance to needle wear, slight wear on the needle, toughness, and water resistance.

2. A record having a reproducing surface formed from a composition containing a vinyl resin identical with that resulting from the conjoint polymerization of vinyl chloride and vinyl acetate in the proportions of at least 70% of the vinyl chloride and which is less than about 30% soluble in toluene at 20° to 30° C., said record being characterized by a low surface noise level, resistance to needle wear, slight wear on the needle, toughness, and water resistance.

3. A record having a reproducing surface formed from a composition containing a vinyl resin identical with that resulting from the conjoint polymerization of vinyl chloride and vinyl acetate in the proportions of about 80% of the vinyl chloride and which is less than about 30% soluble in toluene at 20° to 30° C., said record being characterized by a low surface noise level, resistance to needle wear, slight wear on the needle, toughness, and water resistance.

4. A record having a reproducing surface formed from a composition containing a vinyl resin and a plasticizing material, said vinyl resin being identical with that resulting from the conjoint polymerization of a vinyl halide and a vinyl ester of an aliphatic acid in the proportions of at least 70% of the vinyl halide and which is less than about 30% soluble in toluene at 20° to 30° C., said record being characterized by a low surface noise level, resistance to needle wear, slight wear on the needle, toughness, and water resistance.

5. A record having a reproducing surface formed from a composition containing a vinyl resin and a plasticizing material, said vinyl resin being identical with that resulting from the conjoint polymerization of vinyl chloride and vinyl acetate in the proportions of at least 70% of the vinyl chloride and which is less than about 30% soluble in toluene at 20° to 30° C., said record being characterized by a low surface noise level, resistance to needle wear, slight wear on the needle, toughness, and water resistance.

6. A record having a reproducing surface formed from a composition containing a vinyl resin and a plasticizing material, said vinyl resin being identical with that resulting from the conjoint polymerization of vinyl chloride and vinyl acetate in the proportions of about 80% of the vinyl chloride and which is less than about 30% soluble in toluene at 20° to 30° C., said record being characterized by a low surface noise level, resistance to needle wear, slight wear on the needle, toughness, and water resistance.

7. A record having a reproducing surface formed from a composition containing a vinyl resin, a plasticizing material and a basic stabilizing material, said vinyl resin being identical with that resulting from the conjoint polymerization of a vinyl halide and a vinyl ester of an aliphatic acid in the proportions of at least 70% of the vinyl halide and which is less than about 30% soluble in toluene at 20° to 30° C., said record being characterized by a low surface noise level, resistance to needle wear, slight wear on the needle, toughness, and water resistance.

8. A record having a reproducing surface formed from a composition containing a vinyl resin, a plasticizing material and a basic stabilizing material, said vinyl resin being identical with that resulting from the conjoint polymerization of vinyl chloride and vinyl acetate in the proportions of about 80% of the vinyl chloride and which is less than about 30% soluble in toluene at 20° to 30° C., said record being characterized by a low surface noise level, resistance to needle wear, slight wear on the needle, toughness, and water resistance.

9. A record having a reproducing surface formed from a composition containing a vinyl resin, a plasticizing material, a basic stabilizing material and a filling material, said vinyl resin being identical with that resulting from the conjoint polymerization of a vinyl halide and a vinyl ester of an aliphatic acid in the proportions of at least 70% of the vinyl halide and which is less than about 30% soluble in toluene at 20° to 30° C., said record being characterized by a low surface noise level, resistance to needle wear, slight wear on the needle, toughness, and water resistance.

10. A record having a reproducing surface formed from a composition containing a vinyl resin, a plasticizing material, a basic stabilizing material and a filling material, said vinyl resin being identical with that resulting from the conjoint polymerization of vinyl chloride and vinyl acetate in the proportions of about 80% of the vinyl chloride and which is less than about 30% soluble in toluene at 20° to 30° C., said record being characterized by a low surface noise level, resistance to needle wear, slight wear on the needle, toughness, and water resistance.

FRAZIER GROFF.